United States Patent
Heckbert et al.

(10) Patent No.: US 8,031,204 B1
(45) Date of Patent: Oct. 4, 2011

(54) FONT FILTER USING BILINEAR INTERPOLATION

(75) Inventors: Paul S. Heckbert, Pittsburgh, PA (US); John W. Berendsen, Beaconsfield (CA)

(73) Assignee: NVIDIA Corporation, Santa Clara, CA (US)

(*) Notice: Subject to any disclaimer, the term of this patent is extended or adjusted under 35 U.S.C. 154(b) by 958 days.

(21) Appl. No.: 11/766,741

(22) Filed: Jun. 21, 2007

Related U.S. Application Data

(60) Provisional application No. 60/823,480, filed on Aug. 24, 2006.

(51) Int. Cl.
*G09G 5/00* (2006.01)
(52) U.S. Cl. ........ 345/611; 345/581; 345/582; 345/587; 345/606; 345/467; 345/468
(58) Field of Classification Search ............... None
See application file for complete search history.

(56) References Cited

U.S. PATENT DOCUMENTS

| | | | |
|---|---|---|---|
| 6,400,370 B1* | 6/2002 | Lee et al. | 345/586 |
| 6,967,659 B1* | 11/2005 | Jayavant et al. | 345/506 |
| 7,737,988 B1* | 6/2010 | Toksvig et al. | 345/582 |
| 2004/0102245 A1* | 5/2004 | Escalera et al. | 463/32 |
| 2004/0183817 A1* | 9/2004 | Kaasila | 345/660 |
| 2007/0080972 A1* | 4/2007 | Gruber | 345/582 |
| 2007/0182753 A1* | 8/2007 | Isidoro et al. | 345/587 |

\* cited by examiner

*Primary Examiner* — Kee M Tung
*Assistant Examiner* — Jwalant Amin
(74) *Attorney, Agent, or Firm* — Patterson & Sheridan, LLP

(57) ABSTRACT

Systems and methods used for bilinear texture filtering may also be used to perform font filtering. Font data stored as a texture is read from memory in blocks that are coarsely aligned. Font alignment units may be used to provide a finely aligned region of the font data within a font filter footprint. The finely aligned region is then filtered using bilinear filtering to produce font coverage information representing a grayscale value for a pixel. Using existing bilinear filtering engines in conjunction with font alignment and sample units reduces the need for having a specific engine to perform each of the font filtering operations, possibly saving die area in a graphics system.

20 Claims, 9 Drawing Sheets

FONT FILTER USING BILINEAR INTERPOLATION

CROSS-REFERENCE TO RELATED APPLICATIONS

This application claims benefit of U.S. provisional patent application Ser. No. 60/823,480, filed Aug. 24, 2006, which is herein incorporated by reference.

BACKGROUND OF THE INVENTION

1. Field of the Invention

Embodiments of the present invention generally relate to performing font filtering and, more specifically, to using bilinear texture filtering to produce antialiased fonts.

2. Description of the Related Art

Conventional systems for performing bilinear texture filtering are configured to read texture data and produce filtered texture data. Font characters are stored as 1 bit per texel glyphs. Antialiased fonts may be produced by filtering the glyphs to produce grayscale values representing the per pixel coverage of the filtered glyphs.

Accordingly, it is desirable to reuse texture filtering engines to perform font filtering operations in order to conserve die area.

SUMMARY OF THE INVENTION

The current invention involves new systems and methods for using engines for bilinear texture filtering to perform font filtering. Font data stored as a texture is read from memory in blocks that are coarsely aligned. Font alignment units may be used to provide a finely aligned region of the font data within a font filter footprint. The finely aligned region is then filtered using bilinear filtering to produce font coverage information representing a grayscale value for a pixel. Using existing bilinear filtering engines in conjunction with font alignment and coverage units reduces the need for having a specific engine to perform each of the font filtering operations, possibly saving die area in a graphics system.

Various embodiments of a method of the invention for filtering a font character bitmap represented as a texture map include reading a coarsely aligned region of the font character bitmap, aligning the coarsely aligned region of the font character bitmap with a font filter footprint to produce a finely aligned region of the font bitmap, computing font samples, and filtering the font samples to produce a bilinearly filtered font sample value for the finely aligned region of the font character bitmap. The font samples are font coverage values corresponding to portions of the finely aligned region of the font character bitmap.

Various embodiments of the invention include a system for filtering a font character bitmap represented as a texture map. The system includes a texture read request unit, a font alignment engine, a font sample unit, and a bilinear filter engine. The texture read request unit is configured to read a coarsely aligned region of the font character bitmap. The font alignment engine is configured to align the coarsely aligned region of the texture map with a font filter footprint and produce a finely aligned region of the font character bitmap. The font sample unit is configured to compute font samples representing font coverage values for portions of the coarsely aligned region of the font character bitmap. The bilinear filter engine is configured to bilinearly interpolate the font samples to produce a bilinearly filtered font sample value for the finely aligned region of the font character bitmap.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Using existing bilinear filtering engines in conjunction with font alignment and coverage units reduces the need for having a specific engine to perform each of the font filtering operations, possibly saving die area in a graphics system. Font data stored as a texture is read from memory, aligned to font filter footprint, and bilinearly filtered to produce font coverage information representing a filtered value for a pixel.

Figure 1A:
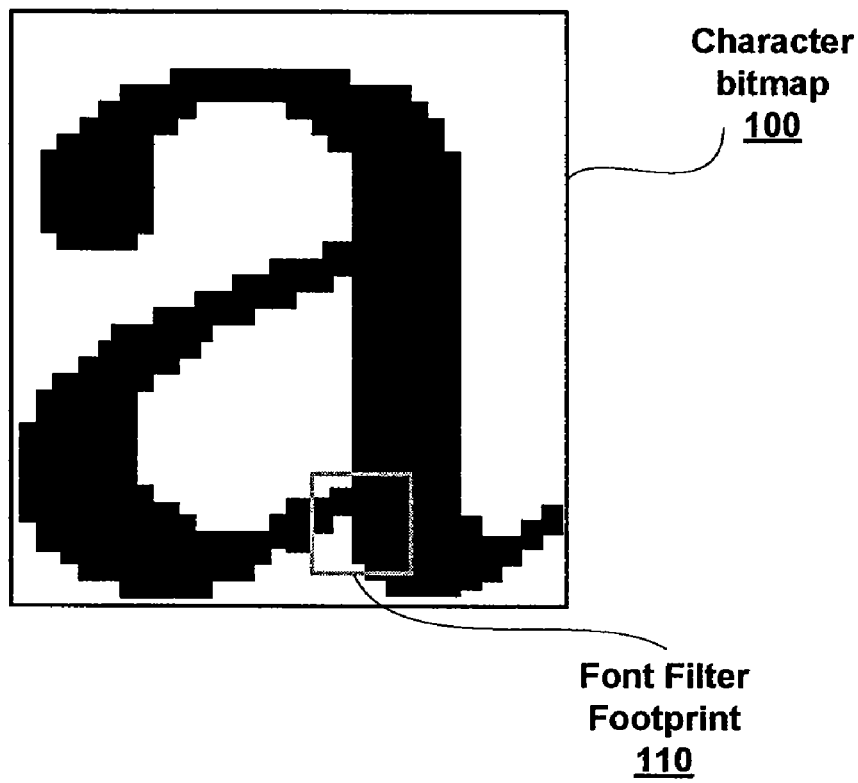
FIG. 1A illustrates a character bitmap and a font filter footprint in accordance with one or more aspects of the present invention.

FIG. 1A illustrates a character bitmap 100 and a font filter footprint 110 in accordance with one or more aspects of the present invention. Font filter footprint 110 is used to extract specific texels from a font glyph represented as character bitmap 100 and filter those texels to produce a coverage value. The coverage value indicates the percentage of texels within font filter footprint 110 that are also within the font character represented by character bitmap 100, i.e. the shaded texels of character bitmap 100. Although font filter footprint 110 is shown as a square, font filter footprints of other shapes, including rectangles, may also be used to extract texels from character bitmaps.

Figure 1B:
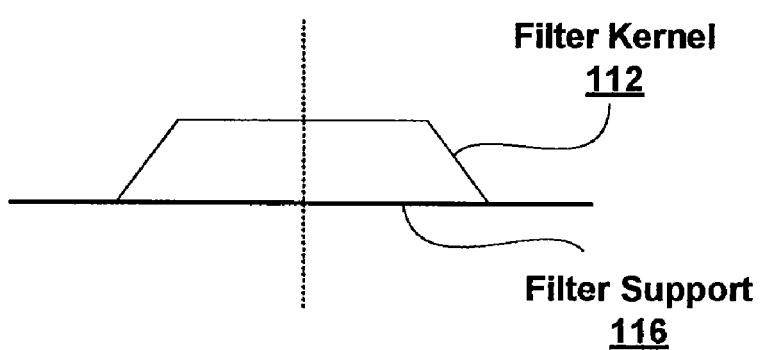
FIG. 1B illustrates a representative filter kernel for the font filter in accordance with one or more aspects of the present invention.

FIG. 1B illustrates a representative filter kernel, filter kernel 112, for font filter footprint 110 in accordance with one or more aspects of the present invention. Filter kernel 112 may be applied to the texels within font filter footprint 110 to produce a filtered font value. In some embodiments of the present invention font filter footprint 110 is 9×9 texels and a filter support 116 of filter kernel 112 is also 9×9 texels. The filter support is the width of the non-zero portion of filter kernel 112, i.e., the base of the pyramid (shown as a trapezoid). A filter size is the width of the trapezoid representing filter kernel 112 at half-height, i.e., support-1. Therefore, when filter kernel 112 has a filter support of 9×9, the filter size is 8×8.

Figure 1C:
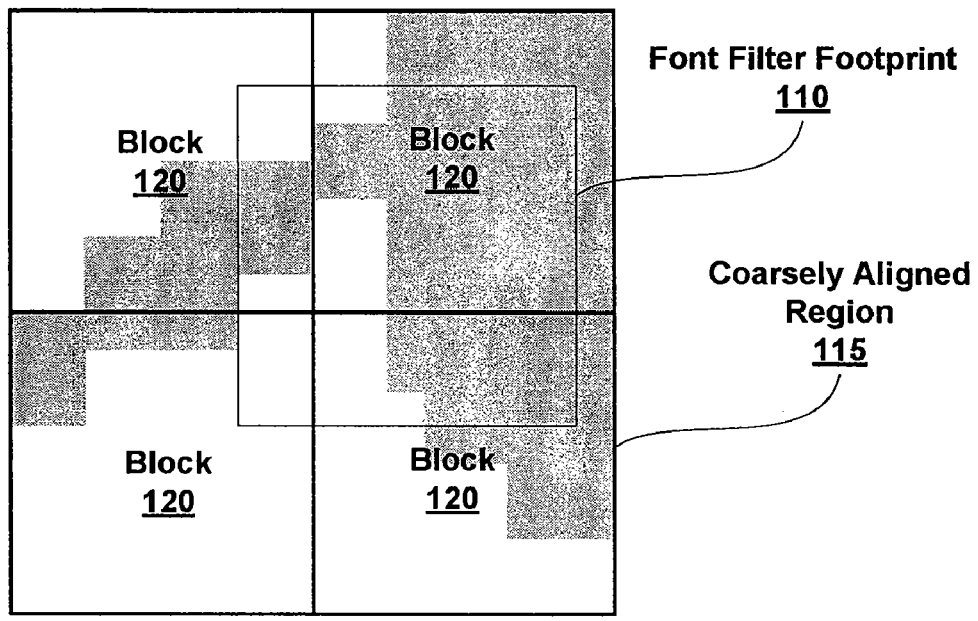
FIG. 1C illustrates the font filter footprint applied to the character bitmap in accordance with one or more aspects of the present invention.

FIG. 1C illustrates font filter footprint 110 applied to character bitmap 100 in accordance with one or more aspects of the present invention. Each block 120 of character bitmap 100 includes an equal number of texels. For example, each block 120 may be 8×8 and include 64 bits, representing 64 texels of a one bit per texel bitmap. Font filter footprint 110 is 9×9 texels and therefore, four blocks 120 are needed to include all of the texels within font filter footprint 110. The center of font filter footprint 110 may be positioned using texture map coordinates, e.g., u and v that include sub-texel precision. The fractional portions of the texture map coordinates may be used during bilinear interpolation, as described in conjunction with FIGS. 3 and 5. When an LCD (liquid crystal device) display is used the font filter footprint alignment may vary as each color component is processed to match the alignment of the red, green, and blue (RGB) screen dots and improve the sharpness of the antialiased font.

Texture data is read from character bitmap 100 in groups of four blocks 120 that are coarsely aligned on a block 120 boundary, forming coarsely aligned region 115. For example, 64×64 texels within coarsely aligned region 115 are read from a texture map and the 64×64 texels are coarsely aligned on an 8×8 texel boundary when block 120 is 8×8 texels. The group of four blocks 120 that form coarsely aligned region 115 may be aligned on any block 120 boundary. In contrast, font filter footprint 110 is aligned on a texel boundary within coarsely aligned region 115. In another embodiment of the present invention, the font filter footprint is 5×5 bits, the block of the character bitmap is 4×4 bits, and the coarsely aligned region is 8×8 bits.

Figure 1D:
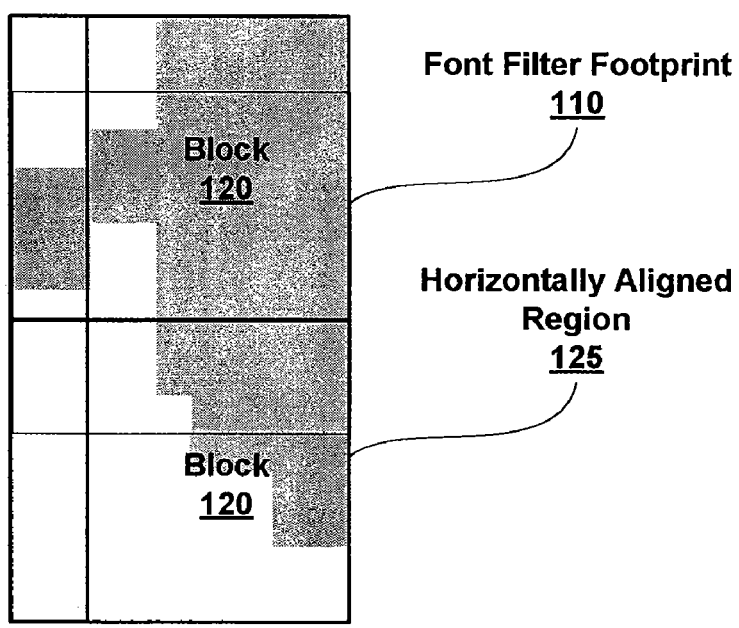
FIG. 1D illustrates a representative horizontally aligned region including the font filter footprint in accordance with one or more aspects of the present invention.

FIG. 1D illustrates a representative horizontally aligned region, horizontally aligned region 125, including font filter footprint 110 in accordance with one or more aspects of the present invention. In order to extract the texels within font filter footprint 110 a width of coarsely aligned region 115 (shown in FIG. 1C) is reduced to match a width of font filter footprint 110, forming horizontally aligned region 125. In other embodiments of the present invention, a vertically aligned region may be formed by reducing a height of coarsely aligned region 115 to match a height of font filter footprint 110. Horizontally aligned region 125 is aligned on a block 120 boundary in the vertical direction and a bit boundary in the horizontal direction. Similarly a vertically aligned region is aligned on a block 120 boundary in the horizontal direction and a bit boundary in the vertical direction.

Figure 1E:
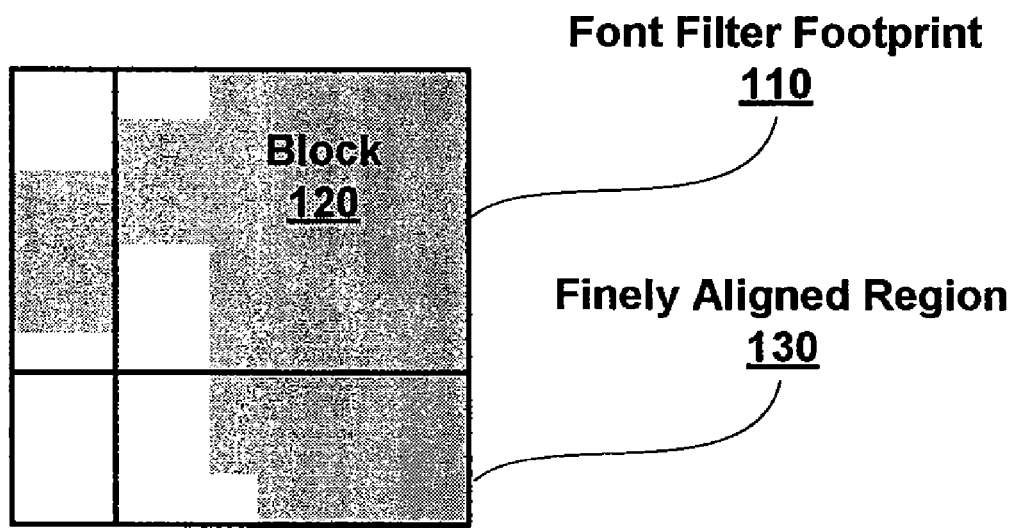
FIG. 1E illustrates a representative finely aligned region including the font filter footprint in accordance with one or more aspects of the present invention.

FIG. 1E illustrates a representative finely aligned region, finely aligned region 130, including font filter footprint 110 in accordance with one or more aspects of the present invention. In order to extract the texels within font filter footprint 110 a height of horizontally aligned region 125 (shown in FIG. 1D) is reduced to match a height of font filter footprint 110, forming finely aligned region 130 that is aligned on a bit boundary in the horizontal and in the vertical directions. Finely aligned region 130 is coincident with font filter footprint 110. Similarly, a width of a vertically aligned region may be reduced to match a width of font filter footprint 110 to form finely aligned region 130 that is aligned on a bit boundary in the horizontal and in the vertical directions.

Figure 2A:
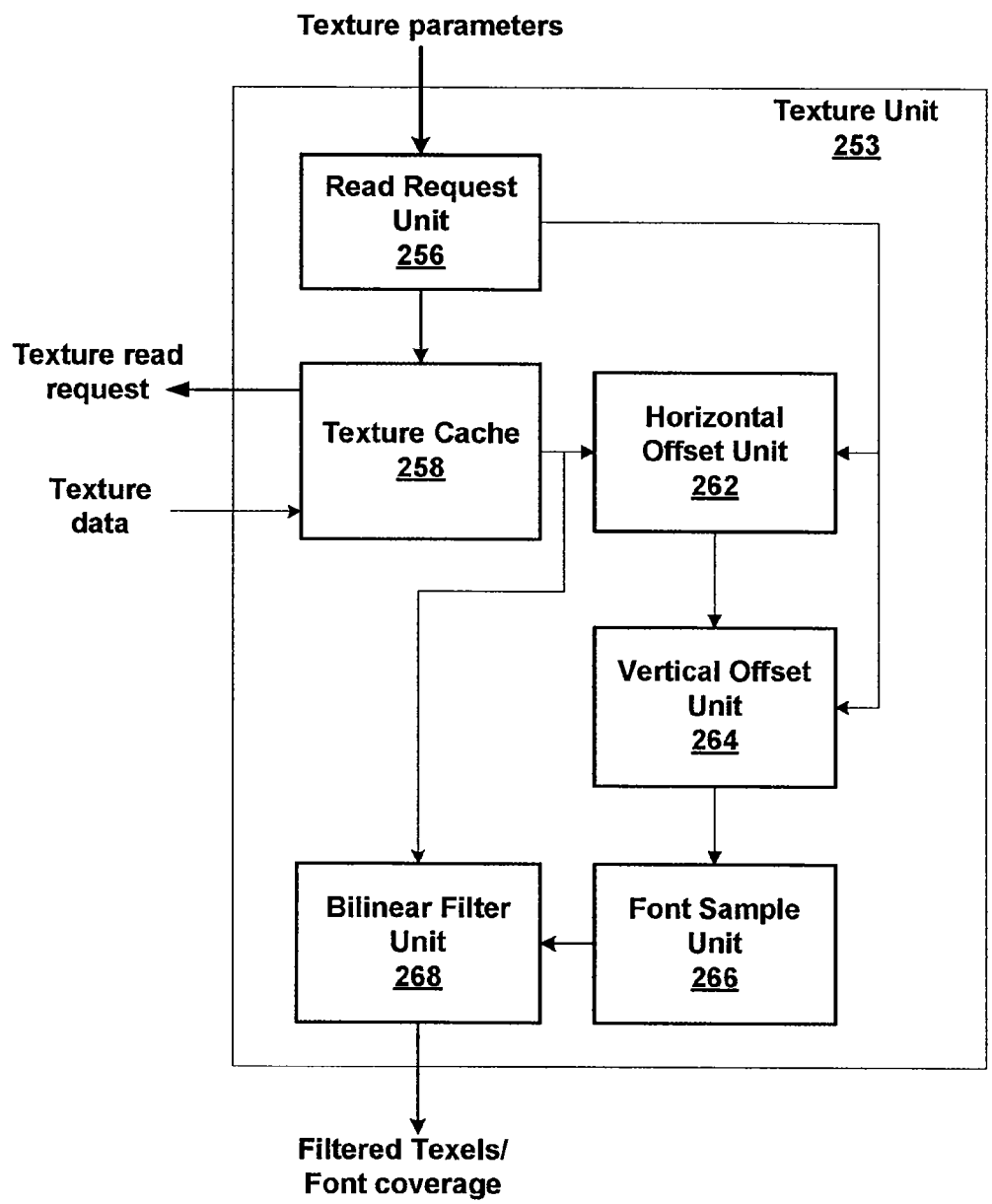
FIG. 2A is an exemplary block diagram of a texture unit including font filtering engines in accordance with one or more aspects of the present invention.

FIG. 2A is an exemplary block diagram of a texture unit, texture unit 253, including font processing engines in accordance with one or more aspects of the present invention. Texture unit 253 includes font processing engines horizontal offset unit 262, vertical offset unit 264, and font sample unit 266. Texture unit 253 also includes a read request unit 256, texture cache 258, and bilinear filter unit 268 for performing conventional texture mapping operations. Additional processing units may be included within texture unit 253 to perform other functions, e.g., level of detail computations, texture address computations, trilinear filtering, anisotropic filtering, and the like. The font processing engines may be used in conjunction with read request unit 256 and bilinear filter unit 268 to perform font filtering operations. Therefore, die area is conserved while providing additional functionality.

Read request unit 256 receives texture parameters, e.g., texture identifier and texture map coordinates, and generates a read request corresponding to a coarsely aligned region of a texture map. When texture unit 253 is configured to perform font filtering, read request unit 256 may be configured to compute texture read addresses using a border address mode. Therefore, the addresses are not permitted to wrap in either the horizontal or vertical direction to sample the opposing side of the character bitmap. Read request unit 256 outputs the read request to texture cache 258. Read request unit 256 outputs horizontal and vertical alignment information, e.g., font filter footprint dimensions and position within the coarsely aligned region, to horizontal offset unit 262 and vertical offset unit 264, respectively. In some embodiments of the present invention, texture cache 258 is omitted and read request unit 256 outputs read requests to a memory resource, e.g., RAM, ROM, or the like. Texels read from the memory resource are received by texture cache 258. When texture cache 258 is omitted, coarsely aligned regions of texels are received by horizontal offset unit 262.

When a texel requested by read request unit 256 is not stored in texture cache 258, texture cache 258 outputs the read request to the memory resource and receives the coarsely aligned region from the memory resource. Texture cache 258 outputs the coarsely aligned region of the texture map that includes the requested texels to horizontal offset unit 262. Horizontal offset unit 262 horizontally aligns the coarsely aligned region to match the width of the font filter footprint to produce a horizontally aligned region of the texture map. Horizontal offset unit 262 outputs the horizontally aligned region to vertical offset unit 264. Vertical offset unit 264 vertically aligns the horizontally aligned region to match the height of the font filter footprint to produce a finely aligned region of the texture map. Vertical offset unit 264 outputs the finely aligned region to font filter unit 266 and bilinear filter unit 268. In other embodiments of the present invention, when texture unit 253 is configured to perform conventional texture mapping horizontal offset unit 262 and vertical offset unit 264 may pass the coarsely aligned region from texture cache 258 to bilinear filter unit 268 unmodified and the connection between texture cache 258 and bilinear filter unit 268 may be omitted.

Font sample unit 266 computes font samples for portions of finely aligned region, as described in conjunction with FIGS. 4A, 4B, 4C, 4D, and 5. The font samples are bilinearly filtered by bilinear filter unit 268 to produce coverage information indicating the percentage of texels within the font filter footprint that are covered by a character. Font sample unit 266 receives the finely aligned region, fractional portions of the texture coordinates, and size dimensions or area of the font filter footprint from vertical offset unit 264. Font sample unit 266 outputs the font samples and fractional portions of the texture coordinates to bilinear filter unit 268. Font sample unit 266 may also output a normalization factor computed using the area of the font filter footprint to bilinear filter unit 268. The normalization factor scales the bilinearly filtered sample value to the range that may be represented by the number of bits used for the font coverage value.

Bilinear filter unit 268 is configured to receive four texels (or font samples) and to bilinearly interpolate the four texels (a 2×2 texel region) based on a programmable filter mode to produce a single texel. When texture unit 253 is configured for conventional texture processing, the coarsely aligned region, including four texels, is read and passed unchanged from texture cache 258 to bilinear filter unit 268. When texture unit 253 is configured for font filtering, the font samples are received from font sample unit 266 and processed as texels.

Each texel processed by bilinear filter unit 268 may include one or more components and each component may range in size from 1 bit to 32 bits or larger. For example, coarsely aligned region 115 of 256 bits may include 4 texels, where each texel includes 4 components that are each 16 bits. When the "nearest" filter mode is used bilinear filter unit 268 outputs one of the four texels as the single bilinearly filtered texel, specifically the one texel that is closest to the position specified by the texture parameters. The font samples received from font sample unit 266 correspond to a single component and may range in value from 0 to the number of texels in a font sample. When a 9×9 font filter footprint is used each font sample may include 8×8 texels and may therefore have a maximum value of 64.

When the "bilinear" filter mode is used bilinear filter unit 268 linearly interpolates between the 4 texels using the sub-texel position information (fractional portions of the texture coordinates) to produce the single bilinearly filtered texel. Bilinear filter unit 268 may be configured to scale the bilinearly filtered font samples by the normalization factor provided by font sample unit 266 using the same computation unit that scales a bilinearly filtered texel by an anisotropic weight. Bilinear filter unit 268 may also be configured to clamp the scaled bilinearly filtered font samples to a maximum value to produce the font coverage value.

Figure 2B:
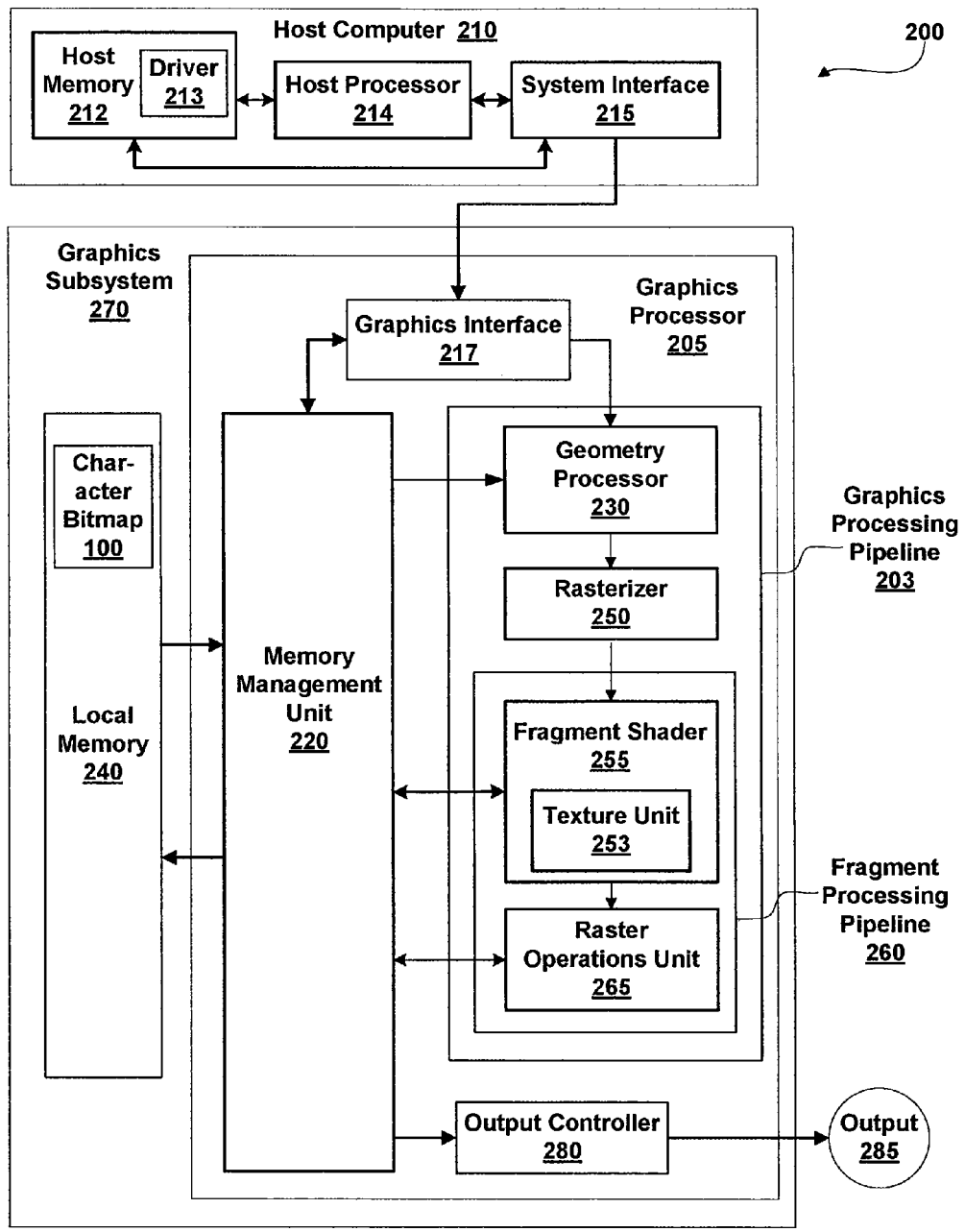
FIG. 2B is a block diagram of a graphics processing system including the texture unit of FIG. 2A in accordance with one or more aspects of the present invention.

FIG. 2B is a block diagram of an exemplary embodiment of a respective computer system, generally designated 200, and including a host computer 210, a graphics subsystem 207, and texture unit 253 of FIG. 2A in accordance with one or more aspects of the present invention. Computing system 200 may be a desktop computer, server, laptop computer, palm-sized computer, tablet computer, game console, portable wireless terminal such as a personal digital assistant or cellular telephone, computer based simulator, or the like. Host computer 210 includes host processor 214 that may include a system memory controller to interface directly to host memory 212 or may communicate with host memory 212 through a system interface 215. System interface 215 may be an I/O (input/output) interface or a bridge device including the system memory controller to interface directly to host memory 212. An example of system interface 215 known in the art includes Intel® Northbridge.

A graphics device driver, driver 213, interfaces between processes executed by host processor 214, such as application programs, and a programmable graphics processor 205, translating program instructions as needed for execution by programmable graphics processor 205. Driver 213 also uses commands to configure sub-units within programmable graphics processor 205. Specifically, driver 213 may specify the texture format and texture filtering mode for one or more texture maps. For example, when font filtering is performed, driver 213 may specify a 1 bit per texel format, bilinear filtering mode, and a border texture address mode. In some embodiments of the present invention, driver 213 may determine the font filter footprint shape and/or dimensions. Driver 213 may also select a particular resolution character bitmap from a set of varying resolution bitmaps. The selection of a particular resolution character bitmap and filter may be based on the display resolution of the character.

Graphics subsystem 207 includes a local memory 240 and programmable graphics processor 205. Host computer 210 communicates with graphics subsystem 270 via system interface 215 and a graphics interface 217 within programmable graphics processor 205. Data, program instructions, and commands received at graphics interface 217 can be passed to a graphics processing pipeline 203 or written to a local memory 240 through memory management unit 220. Programmable graphics processor 205 uses memory to store graphics data, including texture maps, and program instructions, where graphics data is any data that is input to or output from computation units within programmable graphics processor 205. For example, character bitmap 100 may be stored in local memory 240 (as shown) or in host memory 212. Graphics memory is any memory used to store graphics data or program instructions to be executed by programmable graphics processor 205. Graphics memory can include portions of host memory 212, local memory 240 directly coupled to programmable graphics processor 205, storage resources coupled to the computation units within programmable graphics processor 205, and the like. Storage resources can include register files, caches, FIFOs (first in first out memories), and the like.

In addition to Interface 217, programmable graphics processor 205 includes a graphics processing pipeline 203, a memory management unit 220 and an output controller 280. Data and program instructions received at interface 217 can be passed to a geometry processor 230 within graphics processing pipeline 203 or written to local memory 240 through memory management unit 220. In addition to communicating with local memory 240, and interface 217, memory management unit 220 also communicates with graphics processing pipeline 203 and output controller 280 through read and write interfaces in graphics processing pipeline 203 and a read interface in output controller 280.

Within graphics processing pipeline 203, geometry processor 230 and a programmable graphics fragment processing pipeline, fragment processing pipeline 260, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 230 and fragment processing pipeline 260 are optionally configured such that data processing operations are performed in multiple passes through graphics processing pipeline 203 or in multiple passes through fragment processing pipeline 260. Each pass through programmable graphics processor 205, graphics processing pipeline 203 or fragment processing pipeline 260 concludes with optional processing by a raster operations unit 265.

Vertex programs are sequences of vertex program instructions compiled by host processor 214 for execution within geometry processor 230 and rasterizer 250. Shader programs are sequences of shader program instructions compiled by host processor 214 for execution within fragment processing pipeline 260. Geometry processor 230 receives a stream of program instructions (vertex program instructions and shader program instructions) and data from interface 217 or memory management unit 220, and performs vector floating-point operations or other processing operations using the data. The program instructions configure subunits within geometry processor 230, rasterizer 250 and fragment processing pipeline 260. The program instructions and data are stored in graphics memory, e.g., portions of host memory 212, local memory 240, or storage resources within programmable graphics processor 205. Alternatively, configuration information is written to registers within geometry processor 230, rasterizer 250 and fragment processing pipeline 260 using program instructions, encoded with the data, or the like.

Data processed by geometry processor 230 and program instructions are passed from geometry processor 230 to a rasterizer 250. Rasterizer 250 is a sampling unit that processes primitives and generates sub-primitive data, such as fragment data, including parameters associated with fragments (texture identifiers, texture compression formats, texture coordinates, and the like). Rasterizer 250 converts the primitives into sub-primitive data by performing scan conversion on the data processed by geometry processor 230. Rasterizer 250 outputs fragment data and shader program instructions to fragment processing pipeline 260.

The shader programs configure the fragment processing pipeline 260 to process fragment data by specifying computations and computation precision. Fragment shader 255 is optionally configured by shader program instructions such that fragment data processing operations are performed in multiple passes within fragment shader 255. Fragment shader 255 may include one or more texture unit 253. Texture map data may be applied to the fragment data using techniques known to those skilled in the art to produce shaded fragment data. When performing font filtering texture unit 253 outputs font coverage information that is used by fragment shader 255 to produce the shaded fragment data.

Fragment shader 255 outputs the shaded fragment data, e.g., bitmap, color, and depth, and codewords generated from shader program instructions to raster operations unit 265. Raster operations unit 265 includes a read interface and a write interface to memory controller 220 through which raster operations unit 265 accesses data stored in local memory 240 or host memory 212. Raster operations unit 265 may perform near and far plane clipping and raster operations, such as stencil, z test, blending, and the like, using the fragment data and pixel data stored in local memory 240 or host memory 212 at a pixel position (image location specified by x,y coordinates) associated with the processed fragment data. The output data from raster operations unit 265 is written back to local memory 240 or host memory 212 at the pixel position associated with the output data and the results, e.g., image data are saved in graphics memory. For example, when a font filtering is performed font coverage information is written to the location specified by the pixel position.

When processing is completed, an output 285 of graphics subsystem 207 is provided using output controller 280. Alternatively, host processor 214 reads the image stored in local memory 240 through memory management unit 220, interface 217 and system interface 215. Output controller 280 is optionally configured by opcodes to deliver data to a display device, network, electronic control system, other computing system 200, other graphics subsystem 207, or the like.

Figure 3:
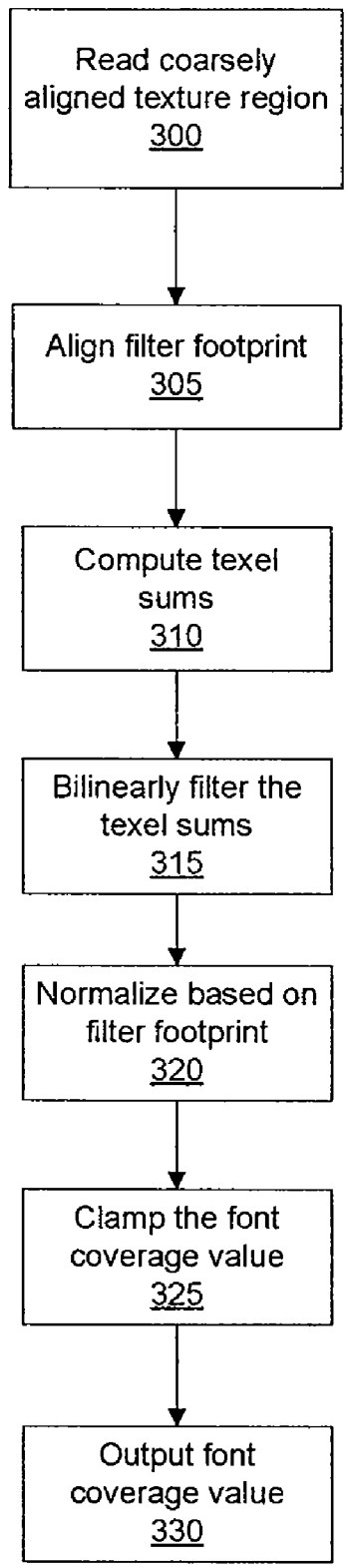
FIG. 3 illustrates a flow diagram of an exemplary method of using texture filtering engines for filtering fonts in accordance with one or more aspects of the present invention.

FIG. 3 illustrates a flow diagram of an exemplary method of using texture filtering engines for filtering fonts in accordance with one or more aspects of the present invention. In step 300 a read request is output by read request unit 256 or texture cache 258 to read a coarsely aligned region of a texture map, e.g., character bitmap. In step 305 the coarsely aligned region is aligned with a font filter footprint. Specifically, texels in the coarsely aligned region that are outside of the width of the font filter footprint are discarded by horizontal offset unit 262 to produce a horizontally aligned region. Similarly, texels in the coarsely aligned region that are outside of the height of the font filter footprint are discarded by vertical offset unit 264 to produce a finely aligned region.

In step 310 font sample unit 266 computes font samples, where each font sample represents a portion of the finely aligned region. The technique used to compute the font samples is described in detail in conjunction with FIGS. 4A, 4B, 4C, 4D, 4E, and 5. Font sample unit 266 outputs the samples and fractional portions of the texture coordinates to bilinear filter unit 268. In step 315 bilinear filter unit 268 bilinearly filters the font samples using "bilinear" mode to compute a bilinearly filtered font sample value. The details of step 315 are also described in conjunction with FIG. 5.

In step 320 bilinear filter unit 268 may also scale the bilinearly filtered font sample value by a normalization factor provided to bilinear filter unit 268 by font sample unit 266 to produce the font coverage value. For example, when the font coverage value is 8 bits a normalization factor is computed as $255/(nu*nv)$, where nu and nv are the size dimensions (support-1) of the font filter footprint. Therefore, when a font filter footprint with a size of 8×8 is used and all of the texels are covered, the bilinearly filtered font sample value of 64 is scaled by 255/64 to produce 255. The numerator of the normalization factor is $2^n-1$, where n is the number of bits used to represent the font coverage value. In some embodiments of the present invention, bilinear filter unit 268 or font sample unit 266 scales each font sample by the normalization factor prior to performing the bilinear interpolation.

In step 325 bilinear filter unit 268 may clamp the font coverage value produced in step 320, to produce a font coverage value that lies within the valid range of values. The font coverage value is clamped to the numerator of the normalization factor when the font coverage value is greater than the numerator of the normalization factor. In step 330 bilinear filter unit 268 outputs the font coverage value for a pixel. The font coverage value may be used as a grayscale component or a color component for a pixel to produce an antialiased font. The font coverage value may be written to a location in memory corresponding to a pixel position by raster operations unit 265.

During the computation of the font coverage value it may be necessary to round values up to ensure that a fully covered font filter footprint is correctly represented as the maximum font coverage value. For example, a fully covered font filter footprint that is 9×9 texels should have a font coverage value of 255 when the font coverage value is 8 bits, 127 when the font coverage value is 7 bits, and so on.

Figure 4A:
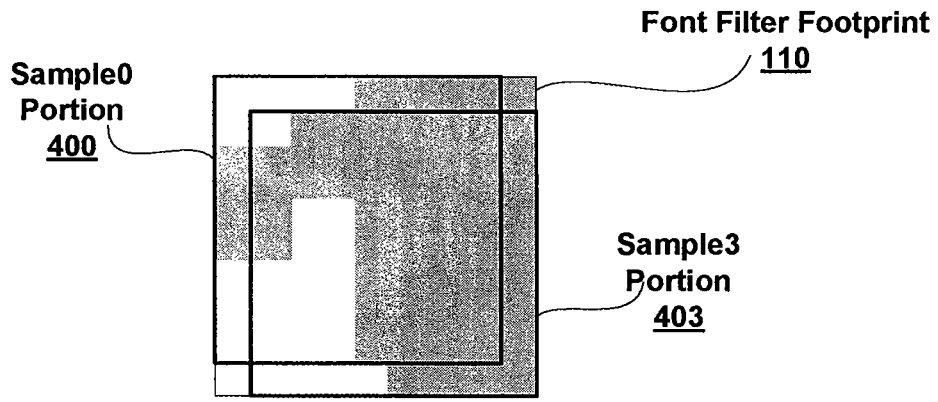
FIGS. 4A and 4B illustrate font samples that are computed for bilinear filtering in accordance with one or more aspects of the present invention.

FIG. 4A illustrates two font sample portions used to compute font samples that are provided to bilinear filter unit 268, in accordance with one or more aspects of the present invention. A first sample, sample° is produced by summing the font coverage in a sample° portion 400 positioned in the upper left corner of font filter footprint 110. A second sample, sample3 is produced by summing the font coverage in a sample3 portion 403 positioned in the lower right corner of font filter footprint 110. Sample°portion 400 and sample3 portion 403 each include an 8×8 texel area of the 9×9 font filter footprint 110. In general, sample portions are sized 1 texel less in each dimension compared with the font filter footprint. A technique used to produce the font coverage values for sample0 and sample3 is described in conjunction with FIGS. 4C, 4D, and 4E.

Figure 4B:
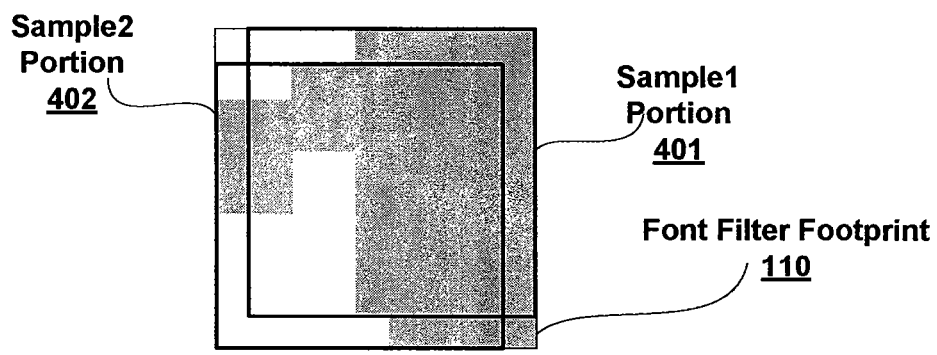

FIG. 4B illustrates two other font sample portions used to compute font samples that are provided to bilinear filter unit 268, in accordance with one or more aspects of the present invention. A third sample, sample2 is produced by summing the font coverage in a sample2 portion 402 positioned in the lower left corner of font filter footprint 110. A fourth sample, sample1 is produced by summing the font coverage in a sample1 portion 401 positioned in the upper right corner of font filter footprint 110. Like sample° portion 400 and sample3 portion 403, sample1 portion 401 and sample2 portion 402 also each include an 8×8 texel area of the 9×9 font filter footprint 110. A technique used to produce the font coverage values for sample2 and sample1 is also described in conjunction with FIGS. 4C, 4D, and 4E.

Figure 4C:
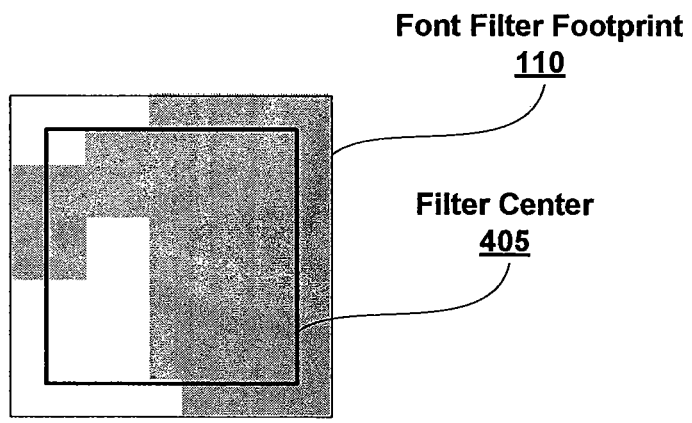
FIGS. 4C, 4D, and 4E illustrate portions of the font filter footprint that are used to compute the font samples of FIGS. 4A and 4B in accordance with one or more aspects of the present invention.

The font samples, sample0, sample1, sample2, and sample3 may be bilinearly interpolated to produce the font coverage value for font filter footprint 110. Each font sample portion includes the center portion of font filter footprint 110 that corresponds to the 7×7 region of texels lying within the flat section of the trapezoid representing filter kernel 112. FIG. 4C illustrates the center portion of font filter footprint 110, filter center 405 that is common to all of the font samples and that are used to compute the font samples of FIGS. 4A and 4B, in accordance with one or more aspects of the present invention. The dimensions of filter center 405 are one texel less than each of the filter size dimensions. Therefore, the dimensions of filter center 405 are 2 texels less than each of the filter support dimensions.

Figure 4D:
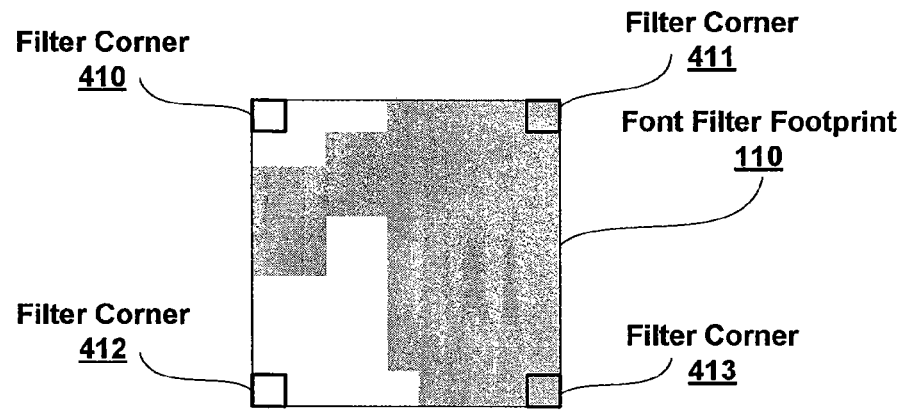

Each of the font samples, sample0, sample1, sample2, and sample3, includes a single texel from a corner of font filter footprint 110. FIG. 4D illustrates the corner portions of font filter footprint 110 that are used to compute the font samples of FIGS. 4A and 4B, in accordance with one or more aspects of the present invention. Specifically, filter corner 410 is used to compute sample0, filter corner 411 is used to compute sample1, filter corner 412 is used to compute sample2, and filter corner 413 is used to compute sample3.

Figure 4E:
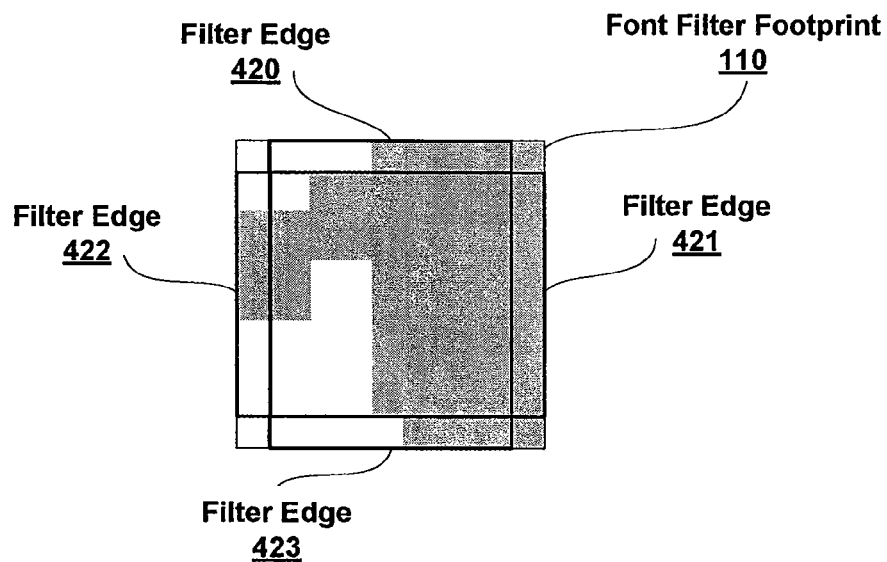

Finally, each of the font samples, sample0, sample1, sample2, and sample3, includes two edges of font filter footprint 110. FIG. 4E illustrates the edge portions of font filter footprint 110 that are used to compute the font samples of FIGS. 4A and 4B, in accordance with one or more aspects of the present invention. Specifically, filter edge 420 is used to compute sample0 and sample1, filter edge 421 is used to compute sample1 and sample3, filter edge 422 is used to compute sample0 and sample2, and filter edge 423 is used to compute sample2 and sample3.

Font sample unit 266 includes multi-input 1-bit adders to compute font coverage values for filter center 405, filter edge 420, filter edge 421, filter edge 422, and filter edge 423. The center, edge, and corner font coverage values may be combined to produce sample0, sample1, sample2, and sample3, corresponding to sample° portion 400, sample1 portion 401, sample2 portion 402, and sample3 portion 403, respectively.

Figure 5:
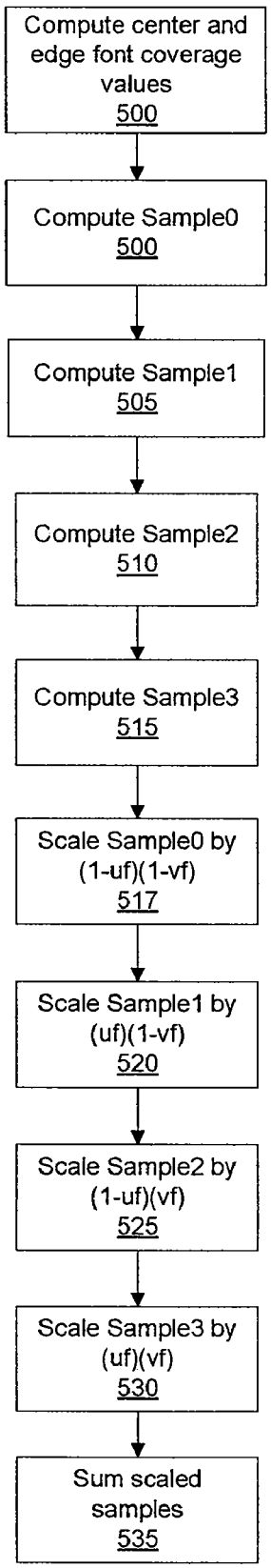
FIG. 5 illustrates a flow diagram of another exemplary method of computing the font samples in accordance with one or more aspects of the present invention.

FIG. 5 illustrates a flow diagram of another exemplary method of computing the font samples and bilinearly filtering the font samples, in accordance with one or more aspects of the present invention. In step 500 font sample unit 266 computes the font coverage values for the font filter center and font filter edges. In step 501 font sample unit 266 computes sample° by summing the font coverage values for font filter center 405, filter edges 420 and 422, and filter corner 410. In step 505 font sample unit 266 computes sample1 by summing the font coverage values for font filter center 405, filter edges 420 and 421, and filter corner 411. In step 510 font sample unit 266 computes sample2 by summing the font coverage values for font filter center 405, filter edges 422 and 423, and filter corner 412. In step 515 font sample unit 266 computes sample3 by summing the font coverage values for font filter center 405, filter edges 421 and 423, and filter corner 413. Font sample unit 266 outputs sample0, sample1, sample2, and sample3 to bilinear filter unit 268.

In step 517 bilinear filter unit 268 scales sample0 by (1-uf)(1-vf), where uf and vf are the fractional portions of the texture coordinates u and v, respectively. In step 520 bilinear filter unit 268 scales sample1 by (uf)(1-vf). In step 525 bilinear filter unit 268 scales sample2 by (1-uf)(vf). In step 530 bilinear filter unit 268 scales sample3 by (uf)(vf). In step 535 bilinear filter unit 268 sums the scaled samples to produce the bilinearly filtered font sample value.

Bilinear filter unit 268 includes a multiplexer that is used to select the sample inputs, normalization factor, and uf and vf received from font sample unit 266 when texture unit 253 is configured to perform font filtering. The sample inputs are used as the 2×2 texels and uf and vf are used as the fractional portions of the texture coordinates to perform bilinear interpolation. The normalization factor may be selected as an anisotropic filter weight to normalize the bilinearly filtered font sample value.

In other embodiments of the present invention, the font coverage value is computed by summing two or more bilinearly filtered font sample values. For example, a 9×9 font filter footprint may be divided into 2 9×5 font filter footprints with the center horizontal row (or vertical column for 2 5×9 font filter footprints) of texels in the 9×9 font filter footprint included in each of the 9×5 font filter footprints, i.e., the sloped side of the trapezoid shape of the filter kernels overlap.

Persons skilled in the art will appreciate that any system configured to perform the method steps of FIG. 3 or 5, or their equivalents, is within the scope of the present invention. In particular, one embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Font filtering instructions may be executed by systems used to perform bilinear texture filtering operations. Texture data is read in coarsely aligned and font processing engines may be used to align the texture data as specified by the texture copy instruction to provide a finely aligned region of the texture data within a font filter footprint. Font samples are computed using the finely aligned region within the font filter footprint. The font samples are bilinearly filtered to provide the filtered font sample to produce an antialiased font. The font filtering is completed using a combination of processing units used for conventional texture processing and specific font filtering units.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of filtering a font character bitmap represented as a texture map, comprising:
    reading a coarsely aligned region of the font character bitmap;
    aligning the coarsely aligned region of the font character bitmap with a font filter footprint to produce a finely aligned region of the font character bitmap;
    computing font samples corresponding to portions of the finely aligned region of the font character bitmap, wherein the font samples indicate a percentage of texels that are within a font character represented by the font character bitmap;
    filtering the font samples using a bilinear filtering engine configured to perform bilinear interpolation to produce a bilinearly filtered font sample value for the finely aligned region of the font character bitmap; and
    computing a font coverage value for the finely aligned region of the font character bitmap by scaling the bilinearly filtered font sample value by a normalization factor.

2. The method of claim 1, wherein the normalization factor equals $2^n/(nu*nv)$, where n is a number of bits used to represent the font coverage value and nu and nv are size dimensions of the font filter footprint.

3. The method of claim 1, further comprising clamping the font coverage value for the finely aligned region of the font character bitmap to be less than or equal to $2^n$.

4. The method of claim 1, wherein the font coverage value is displayed as a grayscale value.

5. The method of claim 1, further comprising:
    computing a center font coverage value for the font filter footprint; and
    computing edge font coverage values for each edge, excluding each corner texel, of the font filter footprint.

6. The method of claim 1, wherein each of the font samples is computed by summing the center font coverage value, two of the edge font coverage values, and a single texel of a corner of the font filter footprint.

7. The method of claim 1, wherein the portions of the finely aligned region of the font bitmap are each sized one texel smaller than the font filter footprint in the horizontal and vertical directions and correspond to an upper left corner of the font filter footprint, a lower left corner of the font filter footprint, an upper right corner of the font filter footprint, and a lower right corner of the font filter footprint.

8. The method of claim 1, wherein the bilinear interpolation uses fractional portions of texture coordinates corresponding to a position of the font filter footprint relative to the font character bitmap.

9. A system for filtering a font character bitmap represented as a texture map, comprising:
    a texture read request unit configured to read a coarsely aligned region of the font character bitmap;
    a font alignment engine configured to align the coarsely aligned region of the texture map with a font filter footprint and produce a finely aligned region of the font character bitmap;
    a font sample unit configured to compute font samples for portions of the finely aligned region of the font character bitmap, wherein the font samples indicate a percentage of texels that are within a font character represented by the font character bitmap;
    a bilinear filter engine configured to bilinearly interpolate the font samples to produce a bilinearly filtered font sample value for the finely aligned region of the font character bitmap; and
    computing a font coverage value for the finely aligned region of the font character bitmap by scaling the bilinearly filtered font sample value by a normalization factor.

10. The system of claim 9, wherein the normalization factor equals $2^n/(nu*nv)$, where n is a number of bits used to represent the font coverage value and nu and nv are size dimensions of the font filter footprint.

11. The system of claim 1, wherein the bilinear filtering engine is further configured to clamp the font coverage value for the finely aligned region of the font character bitmap to a value that is less than or equal to $2^n$.

12. The system of claim 1, wherein the font sample unit is configured to compute each of the font samples by summing the center font coverage value, two of the edge font coverage values, and a single texel of a corner of the font filter footprint.

13. The system of claim 9, wherein the bilinear filter unit includes a multiplexer configured to select the font samples from the font sample unit when a font filtering mode is specified.

14. The system of claim 9, wherein the portions of the finely aligned region of the font bitmap are each sized one texel smaller than the font filter footprint in the horizontal and vertical directions and correspond to an upper left corner of the font filter footprint, a lower left corner of the font filter footprint, an upper right corner of the font filter footprint, and a lower right corner of the font filter footprint.

15. The system of claim 9, wherein the font sample unit is configured to compute a center font coverage value for the font filter footprint and edge font coverage values for each edge, excluding each corner texel, of the font filter footprint.

16. The system of claim 9, further comprising a texture cache coupled to the read request unit and configured to store coarsely aligned regions of the texture map.

17. The system of claim 9, wherein the bilinear filter unit is further configured to bilinearly interpolate the font samples using fractional portions of texture coordinates corresponding to a position of the font filter footprint relative to the font character bitmap.

18. The system of claim 9, wherein the font filter footprint is selected based on a texel resolution of the font character bitmap and a pixel display resolution of the font character bitmap.

19. A method of filtering a font character bitmap represented as a texture map, comprising:
    reading a coarsely aligned region of the font character bitmap;
    aligning the coarsely aligned region of the font character bitmap with a font filter footprint to produce a finely aligned region of the font character bitmap;

computing font samples that are font coverage values corresponding to portions of the finely aligned region of the font character bitmap, wherein the font coverage values indicate a percentage of texels that are within a font character represented by the font character bitmap;

filtering the font samples using a bilinear filtering engine configured to perform bilinear interpolation to produce a bilinearly filtered font sample value for the finely aligned region of the font character bitmap; and scaling the bilinearly filtered font sample value by a normalization factor to produce a font coverage value for the finely aligned region of the font character bitmap, wherein the normalization factor is based on a number of bits used to represent the font coverage value.

20. A system for filtering a font character bitmap represented as a texture map, comprising:

a texture read request unit configured to read a coarsely aligned region of the font character bitmap;

a font alignment engine configured to align the coarsely aligned region of the texture map with a font filter footprint and produce a finely aligned region of the font character bitmap;

a font sample unit configured to compute font samples representing font coverage values for portions of the finely aligned region of the font character bitmap, wherein the font coverage values indicate a percentage of texels that are within a font character represented by the font character bitmap;

a bilinear filter engine configured to bilinearly interpolate the font samples to produce a bilinearly filtered font sample value for the finely aligned region of the font character bitmap and scale the bilinearly filtered font sample value by a normalization factor to produce a font coverage value for the finely aligned region of the font character bitmap, and the normalization factor is based on a number of bits used to represent the font coverage value.

* * * * *

UNITED STATES PATENT AND TRADEMARK OFFICE
CERTIFICATE OF CORRECTION

PATENT NO. : 8,031,204 B1  
APPLICATION NO. : 11/766741  
DATED : October 4, 2011  
INVENTOR(S) : Paul S. Heckbert and John W. Berendsen Page 1 of 1

It is certified that error appears in the above-identified patent and that said Letters Patent is hereby corrected as shown below:

Column 12, Claim 11, line 26 please delete "1" and add --9--.  
Column 12, Claim 12, line 30 please delete "1" and add --9--.

Signed and Sealed this  
Tenth Day of April, 2012

David J. Kappos  
*Director of the United States Patent and Trademark Office*